United States Patent [19]
McGlothlin et al.

[11] Patent Number: 4,954,309
[45] Date of Patent: Sep. 4, 1990

[54] METHOD OF FORMING A POLYMERIC CASING WITH TEXTURED SURFACE

[75] Inventors: Mark W. McGlothlin; Alice A. DePaul, both of San Diego, Calif.

[73] Assignee: Apex Medical Technologies, Inc., San Diego, Calif.

[21] Appl. No.: 260,157

[22] Filed: Oct. 20, 1988

Related U.S. Application Data

[63] Continuation-in-part of Ser. No. 148,788, Jan. 27, 1988, abandoned.

[51] Int. Cl.$^5$ ............................................. B29C 41/00
[52] U.S. Cl. .................................... 264/307; 264/293; 264/301
[58] Field of Search ................ 264/301, 302, 307, 293

[56] References Cited
U.S. PATENT DOCUMENTS 4,061,709  12/1977  Miller et al. ........................ 264/307
4,684,490  8/1987   Taller et al. ........................ 264/296

Primary Examiner—David Simmons
Assistant Examiner—Allan R. Kuhns
Attorney, Agent, or Firm—Townsend and Townsend

[57] ABSTRACT

A polymeric casing with a textured (matte-finish) surface is manufactured by dipping a form having external contours conforming to the desired shape of the casing in a solution of a polymer dissolved in one liquid, withdrawing the form from the solution to retain the solution as a film over the form's outer surface, applying a second liquid over the surface of the film, the second liquid being one which is miscible with the first and in which the polymer is insoluble, then solidifying the polymer into a solid film, preferably by solvent evaporation. Application of the second liquid prior to complete drying of the polymer film causes the resulting film to have a matte finish, which has a lubricous effect without the need for added lubricant powders or liquids, particularly when combined with a mandrel which imparts a similar surface finish to the interior of the film.

36 Claims, No Drawings

METHOD OF FORMING A POLYMERIC CASING WITH TEXTURED SURFACE

CROSS REFERENCE TO RELATED APPLICATION

This application is a continuation-in-part of co-pending application Ser. No. 07/148,788, filed Jan. 27, 1988, now abandoned.

BACKGROUND OF THE INVENTION

This invention relates to polymeric casing, and particularly those used for prophylactic and clinical purposes. Specifically, the invention relates to methods of forming such casings and providing such casings with a lubricous surface.

The casings addressed by the present invention assume a variety of forms. Prophylactic sheaths are one type of example of such casings. Such sheaths are widely used as covering and protective devices for clinical use as well as personal use. The most common forms of such sheaths are surgical gloves, finger cots and condoms. Another examples is an inflatable bladder affixed to the end of a medical catheter for retention of the catheter within a body channel or to distend or maintain an opening to an internal cavity.

The smooth surfaces of the polymeric materials of which these casings are made are highly friction-bearing and tend to stick together. This presents numerous problems. In condoms, finger cots and gloves, for instance, these non-lubricous surfaces make it difficult both to remote the products from their packaging and to position them fully and evenly in place for use without wrinkling or running the risk of tearing the sheath material. In surgical gloves, sticking surfaces further interfere with the user's finger mobility, rendering them awkward and potentially dangerous when used in highly sensitive procedures. An inflatable bladder with a nonlubricous surface requires an externally applied lubricant before it can be inserted into the body channel.

The powders or lubricants commonly used for such casings are not suitable in many situations. Surgical use in many cases precludes the use of powders and lubricants, and allergic reactions may also occur. Uniformity of the application of the lubricant over the casing surface is also a concern in some cases, as is the stability of the lubricant and the difficulty of applying it.

SUMMARY OF THE INVENTION

A novel method is provided herein for rendering the surface of a polymeric casing lubricous during formation of the casing itself, without the addition of any lubricating substance, be it powdered or liquid. The surface is a matte finish surface which is applied to casings which are produced by dipping a form or mold in a liquid from which the polymer is made. The liquid is a solution of a resin or prepolymer, or a solution of a fully cured polymer which forms the casing directly upon the evaporation of the solvent. The form or mold is wettable by the solution which leaves a liquid film over the surface of the form as the form is withdrawn from the solution. The matte finish is formed on the film as it dries (and cures if necessary) to form the casing, and the surface thus affected is the surface facing outward. The matte finish imparts the lubricous character to the casing surface.

In accordance with the present invention, the matte finish is formed by applying a second liquid over the surface of the wet film before the film has fully solidified. The second liquid is one which is miscible with the solvent in the solution forming the underlying film, and yet one in which the polymer or polymer-forming materials are substantially insoluble. The polymer is then permitted to form into a solid film, and as this is occurring, the interaction of the polymer with the solvent and the non-dissolving liquid sufficiently affects the surface of the polymer film being formed to create the matte finish, which overcomes the normal self-sticking character of the polymer and provides a lubricous effect. The casing may be removed from the form after all liquids have been evaporated or otherwise removed, or after most of the liquid has been removed leaving but a small amount of residual liquid on the sheath surface.

For maximum lubricous effect on sheaths such as condoms, finger cots and surgical gloves, the matte finish on the outer surface of the sheath is combined with a textured finish on the inner surface. Although similar in appearance to the outer matte finish, the inner textured finish is imposed on the sheath material by the surface of the form, which is roughened by any of a variety of techniques known to those skilled in the art.

DETAILED DESCRIPTION OF THE INVENTION AND PREFERRED EMBODIMENTS

As stated above, the polymeric casings are prepared by dipping a form or mold bearing the contours of the desired shape of the final product into the liquid from which the polymer is formed, withdrawing the form from the liquid to leave a thin liquid film over the exterior of the form, and then converting the film to a solid, leaving the form encased in the resulting solid, substantially dry sheath, which is then pulled or rolled off. In accordance with the invention, the second liquid is applied to the film either before or during its solidification.

The second liquid, as stated above, is one which is miscible with the solvent in the underlying film, and yet does not dissolve the polymer. The choice of this liquid is otherwise not critical, and the optimum choice in any particular case will depend on the choice of polymer and of the solvent in which the polymer is dissolved. Organic liquids such as hexane, for example, are suited in some systems. In general, however, water is the most preferred liquid in systems where water meets the above criteria.

Application of the second liquid may be achieved in a variety of ways. The liquid may be applied, for example, as droplets over the film surface. Droplets may be formed, for example, by condensing the liquid onto the film from the surrounding atmosphere. Alternatively, the droplets can be applied by the direct spraying of a fine mist over the film surface. Best results are obtained when extremely fine droplets are applied.

In systems using water as the second liquid, condensation from the surrounding atmosphere may be achieved using an atmosphere containing sufficient moisture to permit this to occur. The condensation may be induced by lowering the temperature of the atmosphere by external means below the dew point, or in a preferred manner, by lowering the temperature of the film itself. Most preferably, the latter effect may be achieved by the cooling effect of the evaporation of the solvent when one is present. When such evaporative cooling is used to achieve the condensation, the rate and degree of condensation will depend on various system parameters, including the relative humidity of the atmosphere, the latent heat of vaporization of the solvent, and the thermal characteristics of the form which supports the film. Further considerations include the amount of solvent present in the solution, the volatility of the solvent, and the rate at which the form is withdrawn from the solution.

Forms most suitable for use when condensation is to be achieved by evaporative cooling are those which have high heat transfer characteristics. Specifically, those which retain a minimum amount of heat as the film cools during evaporation of the solvent (i.e., those which cool rapidly with the cooling film) are preferred. Forms of this type will permit the evaporative cooling to have its maximum effect in lowering the temperature of the polymer film. Forms may be constructed of metal, such as for example aluminum, stainless steel or copper; polymeric materials, such a for example polyethylene, polypropylene or polytetrafluoroethylene (Teflon); ceramics such as glass or porcelain; and composite materials such as Teflon-coated or glass-coated metals. For high heat transfer characteristics, a low mass form and particularly a thin-walled hollow form is preferred. Hollow forms made from materials having high thermoconductivities are preferred. Thermoconductivities of at least about $20 \times 10^{-4}$ cal/sec-cm-°C. are particularly preferred. Thin-walled hollow glass forms for example have particularly effective heat transfer characteristics. Hollow glass forms with wall thicknesses of less than 0.25 inch are preferred, with less than 0.15 inch particularly preferred. Thin-walled hollow plastic forms (using the polymeric materials listed above) are also preferred, notably those having wall thicknesses of less than 0.125 inch, with those having wall thickness less than 0.040 inch particularly preferred.

For condensation to occur on the wet film upon withdrawal of the form from the polymer solution, the atmosphere above the solution will contain water vapor. The relative humidity needed to achieve the condensation effect will depend on how condensation is achieved—i.e.. either by an externally induced temperature drop or by evaporative cooling of the film itself. Variations in the ambient temperature and relative humidity will also affect the rate and amount of condensation. In most applications where evaporative cooling is used, best results are achieved with an atmosphere having a relative humidity of at least about 50%, preferably from about 70% to about 95%. The ambient temperature is not critical. In most cases, however, best results will be obtained within a range of from about 10° C. to about 30° C., preferably from about 15° C. to about 25° C. Circulation of the air in the atmosphere at a mild rate will enhance the uniformity of condensation over the film surface.

The formation of the film and the character of the resulting casing will be determined in part by the rate of withdrawal of the form from the polymer solution. Continuous withdrawal at a steady rate is preferred for maximum uniformity in the final product.

The rate of withdrawal will be selected with certain considerations in mind. For example the thickness of the ultimate film will vary with the rate of withdrawal, a faster withdrawal rate producing a thicker film. (The film thickness will further be affected by other system parameters, such as the concentration of polymer in the solution, as discussed below.) The withdrawal rate should be slow enough, however, to permit the evaporation of a major amount of the solvent within a short distance from the liquid surface, i.e., sufficient solvent evaporation to convert the film to a thixotropic form (i.e.. immobilized on the surface of the form although possibly still tacky due to a small amount of solvent remaining). This minimizes solution runoff and promotes uniformity of the film in terms of thickness and polymer distribution.

In addition to these considerations, one will also consider the nature of the casing being formed when determining a withdrawal rate. Thus, the thickness will vary depending on whether the casing is to be a sheath such as a glove, a condom, or some other type of prophylactic, or an inflatable bladder. In most applications, best results are achieved with withdrawal rates which result in the film achieving a thixotropic state by the time it reaches a distance of about two inches from the solution surface. Preferred withdrawal rates are those by which the film reaches a thixotropic state within about one inch from the solution surface. In most applications, best results will be obtained using withdrawal rates of about 0.1 inch per second or less. In the case of simple forms such as those used for condom manufacture, a withdrawal rate of about 0.06 inch per second has been found to be particularly effective.

Minimum thickness is preferred in all cases, provided that adequate strength is retained to eliminate tearing and pinhole formation during manufacture or use. In the case of polyurethane films, very thin films permit high rates of moisture vapor transmission (breathability). i.e., the passage of water vapor through the finished film to the atmosphere when there is a humidity gradient across the film. This is a feature which is particularly useful in surgical gloves since it minimizes the discomfort of perspiration. The moisture vapor transmission rate varies inversely with the film thickness, the correlation having a particularly high slope at film thicknesses below about 5 mils.

The immersion of the form into the polymer solution is of less concern, having less of an effect on the final product. The major consideration during immersion is to avoid the entrapment of bubbles on the tip of the form, or depending on the shape of the form, at any portion of the surface where the contour would inhibit smooth flow. In most applications, immersion rates of 0.5 inches per second or less will provide the best results. For simple forms such as mandrels used in condom manufacture, an immersion rate of approximately 0.4 inch per second has been found to be effective.

In further embodiments of the invention, as mentioned above, the droplets may be applied to the polymer film emerging from the solution by the spraying of a fine water mist on the film. This eliminates the considerations of temperature, humidity, and heat transfer characteristics of the form, as well as other considerations necessary to achieve condensation. Any conventional means of atomizing water and applying the resulting mist or spray uniformly over the film may be used. The use of an ultrasonic humidifier is one example of a means of achieving this result.

The present invention extends to a wide range of polymers used as the sheath materials, including any such materials which can be fabricated from a dipping solution and formed in place on the surface of a form. This includes the wide range of known polymeric materials, particularly thermoplastic elastomers. Examples include natural and synthetic rubber latices, polymer plastisols, polyurethanes, and regenerated collagens, as well as copolymers, interpolymers, and block copolymers of these and other materials. Examples of rubber latices, for instance, are polybutadiene, polyisoprene, polychloroprene, polynitriles, polyacrylates, silicones, and various fluoroelastomers.

The use of block copolymers, for instance, is an effective way of controlling the characteristics of the finished polymer. This is achieved by judicious selection of the hard and soft segments which comprise the copolymer. As is known among those skilled in the art, the soft segment is generally a long chain flexible component having a glass transition temperature below room temperature, and the hard segment is generally a shorter stiffer component having a glass transition temperature above room temperature and tending toward physical cross linking with like segments. One selects hard and soft segments of appropriate structure as well as the proportions and arrangements in which they are combined in order to provide a resulting block copolymer with the desired properties. The selection of the particular segments as well as their proportions and arrangements in the block copolymer are within the knowledge of those skilled in the copolymer art.

One example of a block copolymer useful in the present invention is a product designated T722-A, available from E. I. du Pont de Nemours & Co., Inc., Wilmington. Delaware, identified by the manufacturer as a polyether copolymer with polyether soft segment. Sheaths made of this material are preferably formed by dipping the form in a solution or liquid mixture of the polymer-forming components and heat curing the components on the form after withdrawal to form the copolymer. Alternatively, the sheath may be formed by dipping the form in a solution of the copolymer in a volatile solvent, followed by withdrawal of the form to leave a film of the solution on the form surface, then evaporating the solvent from the film. A range of solvents may be used. A preferred solvent is meta-cresol.

Polyurethanes are also of interest, particularly those which are soluble in a volatile solvent at high concentrations, and those from which the solvent will evaporate to leave a finished product without the need for further curing. Thermoplastic, primarily linear polyurethanes are preferred. Examples include both polyether-based and polyester-based polyurethanes, as well as those based on a combination of both. Examples further include polyurethanes in the form of block copolymers, and polyurethanes containing chain extenders and modifiers.

The polyurethanes may be formed from a wide range of polyisocyanates and polyols. Examples of polyisocyanates are aromatic and alicyclic diisocyanates such as 4,4'-diphenyl methane diisocyanate (MDI), toluene diisocyanate (TDI), isophorone diisocyanate (IPDI), methylene bis-(4-cyclohexyl) diisocyanate (HMDI), and 1,4-diisocyanatobenzene (PPDI). Examples of polyester diols are polylactones such as polycaprolactone polyol, and copolymers of short chain diols and aliphatic dicarboxylic acids such as poly(ethylene adipate) polyol, poly(ethylene succinate) polyol, poly-(ethylene sebacate) polyol, poly(butylene adipate) polyol, and poly(diethylene ether adipate) polyol. An example of a polyether polyol is poly(tetramethylene ether) glycol. All such materials are well known among those skilled in the art, and either commercially available or capable of preparation by conventional methods. Many such materials and the polymers formed from them are commercially available.

Preferred polyurethanes will be those which combine high strength with a high degree of softness. The strength, expressed in terms of tensile strength, will be at least about 5,000 psi, preferably from about 5,000 to about 10,000 psi, and most preferably from about 7,000 to about 9,000 psi. The softness, expressed as Shore A hardness, preferably ranges from about 60 to about 80. Likewise, the 100% tensile modulus will be at least about 200 psi, preferably from about 200 psi to about 600 psi. The strength to hardness ratio, expressed in terms of the units given above, will generally range from about 50 to about 200, preferably from about 80 to about 125.

With these properties, the thickness of the sheath is selected to produce the desired tensile strength and 100% tensile modulus. The thickness in the case of polyurethane condoms is generally less than 0.0014 inch, and preferably ranges from about 0.0004 inch to about 0.0014 inch, most preferably from about 0.0006 inch to about 0.0009 inch. For polyurethane surgical gloves, preferred thicknesses are in the range of about 0.001 inch to about 0.002 inch.

Preferred solvents for the polymer will generally be nonaqueous solvents. A wide range of solvents may be used, provided that they are inert with respect to the particular polyurethane used, stable throughout the conditions encountered during formation of the sheath, and preferably volatile and capable of dissolving the polyurethane in high concentrations. Examples are aliphatic hydrocarbons, such as for example n-pentane, n-hexane, and isohexane; alicyclic hydrocarbons, such as for example cyclopentane and cyclohexane; aromatic hydrocarbons, such as for example benzene and toluene; halogenated hydrocarbons, such as for example methylene dichloride, 1,2-dichloroethane, 1,1,1-trichloroethane, and 1,1,2-trichloroethane; esters, such as for example ethyl acetate; ethers, such as for example diethyl ether, ethyl n-propyl ether, and ethyl isopropyl ether; ketones, such as for example acetone and methyl ethyl ketone; and heterocyclic compounds, such as for example furan, tetrahydrofuran, and alkyl- and halo-substituted analogs of these.

A particularly preferred solvent is tetrahydrofuran. Mixtures of solvents may also be used, such as for example tetrahydrofuran combined with one or more of the following—methyl ethyl ketone, methylene chloride, and acetone. Preferred solvents are those having boiling points less than about 80° C. those boiling at less than about 75° C. particularly preferred.

As mentioned above, the concentration of the polymer in the solution will affect the procedure as well as the properties of the final product, by affecting the viscosity of the solution, the rate of evaporation, and the degree of interaction between the water and the polymer as the matte finish is being formed on the surface of the film. In most cases, best results will be obtained with solutions containing the polymer at a concentration of about 5% to about 30% by weight, preferably about 15% to about 25% by weight.

Once the second liquid has been applied, preferably in the form of water droplets, the film is thoroughly dried to form the final product, a solid dry casing, by evaporating all liquids. This may conveniently be achieved by air drying the film, and in most cases under the same temperature conditions used for the immersion and withdrawal steps. The form may thus simply be left suspended in the atmosphere above the dipping solution until all water and solvent have evaporated off. During or after this time, an end ring may be placed over the film along the border (at the dip line), to facilitate removal of the casing from the form, and also to serve as a retaining ring for the finished product during use. Removal of the finished casing from the form is then achieved in the conventional manner, notably by rolling the casing from the border downward and off of the form.

The matte finish resulting from the treatment will be retained on the surface of the final product. The matte finish will provide a translucent appearance to an otherwise transparent sheath, and will provide a lubricous surface, essentially eliminating the tendency of the surface to stick against itself when rolled or folded over, without the need for fluid or powdered lubricant.

As mentioned above, the present invention extends to casings of a variety of forms. Examples include prophylactic sheaths such as condoms, surgical gloves and finger cots. Further examples are inflatable bladders or balloons. Further features having specific advantages for particular types of sheaths may be incorporated in the procedures described above. In the case of condoms and finger cots, for instance, reinforced borders in the form of rings or bands may be added to promote the retention of the sheath while in use, and to facilitate rolling of the edge of the sheath during application to the body member. The rings or bands may be of material which is the same as or different than that used in the sheath itself. In the case of gloves, it is sometimes desirable to vary the thickness of the material among different sections of the glove surface. This may be achieved by using multiple dips of the glove form in the dipping solution, varying the depth of the dip or the height of withdrawal in between dips. Such a technique can be used, for example, to provide gloves with relatively thick cuffs and relatively thin finger portions.

In the case of prophylactic sheaths, it is often desirable to form a lubricous surface on both sides of the sheath. This may be achieved within the scope of the present invention, by using a sheath form which has a textured surface, such as a glass form with a surface which has been roughened by particle blasting, abrasion, chemical etching or other suitable means. The optimum degree of roughness will vary with the nature of the sheath and its intended use. In most cases, a roughness of about 60 microinches or less, preferably from about 20 microinches to about 60 microinches, will provide a sufficiently lubricous effect without significantly compromising the sheath integrity and its transmission characteristics.

The following example is offered for illustrative purposes, and is intended neither to define nor limit the invention in any manner.

EXAMPLE

A solution of a polyester polyurethane in tetrahydrofuran was prepared, using a polyurethane designated PS 49-100, supplied by K. J. Quinn & Co., Inc., Malden, Mass. The polyurethane is characterized by a Shore A hardness of 70-75, a tensile strength of 8,000 psi, a 100% modulus of elongation of 550 psi, a 300% modulus of elongation of 1650 psi, an elongation of 560% and a tear strength of 400 psi. The solution was prepared using 17 parts by weight of the polymer and 83 parts by weight of the solvent. A hollow glass condom mandrel having a wall thickness of 0.125 inch was dipped in the solution to an 8 inch length at an immersion rate of 0.4 inch per second, then withdrawn at a steady withdrawal rate of 0.06 inch per second, into an atmosphere of air at room temperature (approximately 21° C.) having a relative humidity of 60%. A mist formed on the film surface as the mandrel was withdrawn from the dipping solution, and the mandrel was held suspended above the solution for one minute after withdrawal. After a 20-minute drying period, the resulting condom was then removed from the mandrel, and appeared fully dry and solidified, with a translucent appearance indicating a matte finish on the outer surface. A uniform film with a thickness of 0.0008±0.0001 inch was produced.

The experiment was repeated under identical conditions except for the humidity of the atmosphere, which was reduced to 40%. No condensation was observed on the film surface as the mandrel was withdrawn from the dipping solution, and the finished condom was transparent rather than translucent, indicating a smooth outer surface rather than a matte finish.

The foregoing is offered primarily for purposes of illustration. It will be readily apparent to those skilled in the art that numerous variations and modifications of the materials and procedures described above may be made without departing from the spirit and scope of the invention.

What is claimed is:

1. A method for the manufacture of a polymeric casing of preselected shape having a lubricous surface, said method comprising:
   (a) immersing a form of said preselected shape in a solution of a solid-polymer-forming material dissolved in a first liquid;
   (b) withdrawing said form from said solution to retain a liquid film thereof on said form;
   (c) contacting said film with a second liquid which is miscible in all proportions with said first liquid and in which said solid-polymer-forming material is substantially insoluble;
   (d) converting said solid-polymer-forming material to a solid polymer film over said form with a matte surface; and
   (e) removing said solid polymer film from said form.

2. A method in accordance with claim 1 in which step (c) comprises applying water droplets substantially uniformly over the surface of said film.

3. A method in accordance with claim 1 in which said solid-polymer-forming material is a fully cured polymer prior to step (a).

4. A method in accordance with claim 1 in which said first liquid is a nonaqueous solvent.

5. A method in accordance with claim 1 in which said first liquid is a water-miscible nonaqueous solvent and said second liquid is water.

6. A method in accordance with claim 1 in which said first liquid is a water-miscible nonaqueous solvent with a boiling point less than about 80° C.

7. A method in accordance with claim 1 in which said polymer is polyurethane and said solid-polymer-forming liquid is a solution of said polyurethane in a water-miscible nonaqueous solvent with a boiling point less than about 80° C. and step (d) comprises evaporating substantially all said water-miscible nonaqueous solvent from said liquid film.

8. A method for the manufacture of a polyurethane casing of preselected shape having a lubricous surface, said method comprising:

(a) immersing a form of said preselected shape in a solution of said polyurethane in a solvent miscible with water in all proportions having a boiling point less than about 80° C.;

(b) withdrawing said form from said solution to retain a liquid film of said solution thereon and to cause evaporation of said solvent from the liquid film thus formed;

(c) contacting said liquid film with water prior to complete evaporation of said solvent therefrom;

(d) evaporating substantially all remaining solvent from said liquid film to leave a solid film with a matte surface; and (e) removing said solid polymer film from said form.

9. A method in accordance with claim 8 in which step (b) comprises withdrawing said form from said solution at a rate whereby by the time the film thus formed reaches a distance of about 2 inches from the surface of said solution sufficient solvent has evaporated therefrom to convert said film to a substantially non-fluid state.

10. A method in accordance with claim 8 in which step (b) comprises withdrawing said form from said solution at a rate whereby by the time the film thus formed reaches a distance of about 1 inch from the surface of said solution sufficient solvent has evaporated therefrom to convert said film to a substantially non-fluid state.

11. A method in accordance with claim 8 in which step (b) comprises withdrawing said form into an atmosphere containing water vapor, and step (c) comprises condensing water from said atmosphere onto said film prior to complete evaporation of solvent therefrom.

12. A method in accordance with claim 11 in which said atmosphere has a relative humidity of at least about 50%.

13. A method in accordance with claim 11 in which said atmosphere has a relative humidity of from about 50% to about 75%.

14. A method in accordance with claim 11 in which steps (b) and (c) are performed at a temperature of from about 10° C. to about 30° C.

15. A method in accordance with claim 11 in which steps (b) and (c) are performed at a temperature of from about 15° C. to about 25° C.

16. A method in accordance with claim 8 in which said solvent has a boiling point of less than about 75° C.

17. A method in accordance with claim 8 in which said solvent has a boiling point of less than about 70° C.

18. A method in accordance with claim 8 in which said form is sufficiently thermally conductive to cool substantially as a result of evaporative cooling occurring in said film due to said evaporation of step (b).

19. A method in accordance with claim 8 in which said form is hollow and formed of a material having a thermal conductivity of at least about $20 \times 10^{-4}$ cal/sec-cm-°C.

20. A method in accordance with claim 8 in which said form is hollow, has a wall thickness of less than 0.25 inch, and has a thermal conductivity of at least about $20 \times 10^{-4}$ cal/sec-cm-°C.

21. A method in accordance with claim 8 in which said form is made of glass, is hollow, and has a wall thickness of less than about 0.25 inch.

22. A method in accordance with claim 8 in which said form is made of glass, is hollow, and has a wall thickness of less than about 0.15 inch.

23. A method in accordance with claim 8 in which said form is made of plastic, is hollow, and has a wall thickness of less than about 0.125 inch.

24. A method in accordance with claim 8 in which said form is made of plastic, is hollow, and has a wall thickness of less than about 0.040 inch.

25. A method for the manufacture of a polyurethane casing of preselected shape having a lubricous surface, said method comprising:

(a) immersing a hollow glass form of said preselected shape having a wall thickness of less than about 0.25 inch in a solution of said polyurethane in a solvent miscible with water in all proportions having a boiling point less than about 80° C.;

(b) withdrawing said form from said solution at a rate whereby by the time the film thus formed reaches a distance of about 2 inches from the surface of said solution sufficient solvent has evaporated therefrom to convert said film to a substantially non-fluid state, into an atmosphere of sufficient humidity to condense water therefrom onto said film as a result of cooling of said film caused by said evaporation;

(c) evaporating substantially all remaining solvent from said film to leave a solid film with an outer surface having a matte finish; and (d) removing said solid film from said form.

26. A method for the manufacture of a polyurethane casing of preselected shape having a lubricous surface, said method comprising:

(a) immersing a hollow glass form of said preselected shape having a wall thickness of less than about 0.15 inch in a solution of said polyurethane in a solvent miscible with water in all proportions having a boiling point less than about 70° C.;

(b) withdrawing said form from said solution at a rate whereby by the time the film thus formed reaches a distance of about 1 inch from the surface of said solution sufficient solvent has evaporated therefrom to convert said film to a substantially non-fluid state, into an atmosphere having a relative humidity of at least about 50% to condense water therefrom onto said film;

(c) evaporating substantially all remaining solvent from said film to leave a solid film with an outer surface having a matte finish; and (d) removing said solid film from said form.

27. A method in accordance with claim 8 in which step (c) comprises spraying water droplets over said surface.

28. A method in accordance with claim 8 in which step (c) comprises spraying water droplets generated by an ultrasonic humidifier over said surface.

29. A method in accordance with claim 8 in which step (b) is performed by withdrawing said form from said solution continuously at a rate of about 0.5 to about 20 inches per minute.

30. A method in accordance with claim 8 in which step (b) is performed by withdrawing said form from said solution continuously at a rate of about 1 to about 10 inches per minute.

31. A method in accordance with claim 8 in which the concentration of said polyurethane in said solution is from about 5% to about 35% by weight.

32. A method in accordance with claim 8 in which the concentration of said polyurethane in said solution is from about 15% to about 25% by weight.

33. A method in accordance with claim 8 in which said solvent is a member selected from the group consisting of tetrahydrofuran, methyl ethyl ketone, methylene chloride, acetone, and mixtures thereof.

34. A method in accordance with claim 8 in which said solvent is a member selected from the group consisting of tetrahydrofuran and mixtures of organic solvents of which tetrahydrofuran is a component.

35. A method in accordance with claim 8 in which said solvent is tetrahydrofuran.

36. A method for the manufacture of a polyurethane casing of preselected shape having a lubricous surface, said method comprising:

(a) immersing a hollow glass form of said preselected shape having a wall thickness of less than about 0.15 inch in a solution of said polyurethane in tetrahydrofuran at a concentration of from about 15% to about 25% by weight;

(b) withdrawing said form from said solution continuously at a rate of about 1 to about 10 inches per minute, into an atmosphere having a relative humidity of at least about 50% to condense water therefrom onto said film;

(c) evaporating substantially all remaining tetrahydrofuran from said film to leave a solid film with an outer surface having a matte finish; and (d) removing said solid film from said form.

* * * * *